March 29, 1966  D. L. KLASS ETAL  3,242,807
ULTRAVIOLET ABSORBING COMPOSITION
Filed Dec. 26, 1961
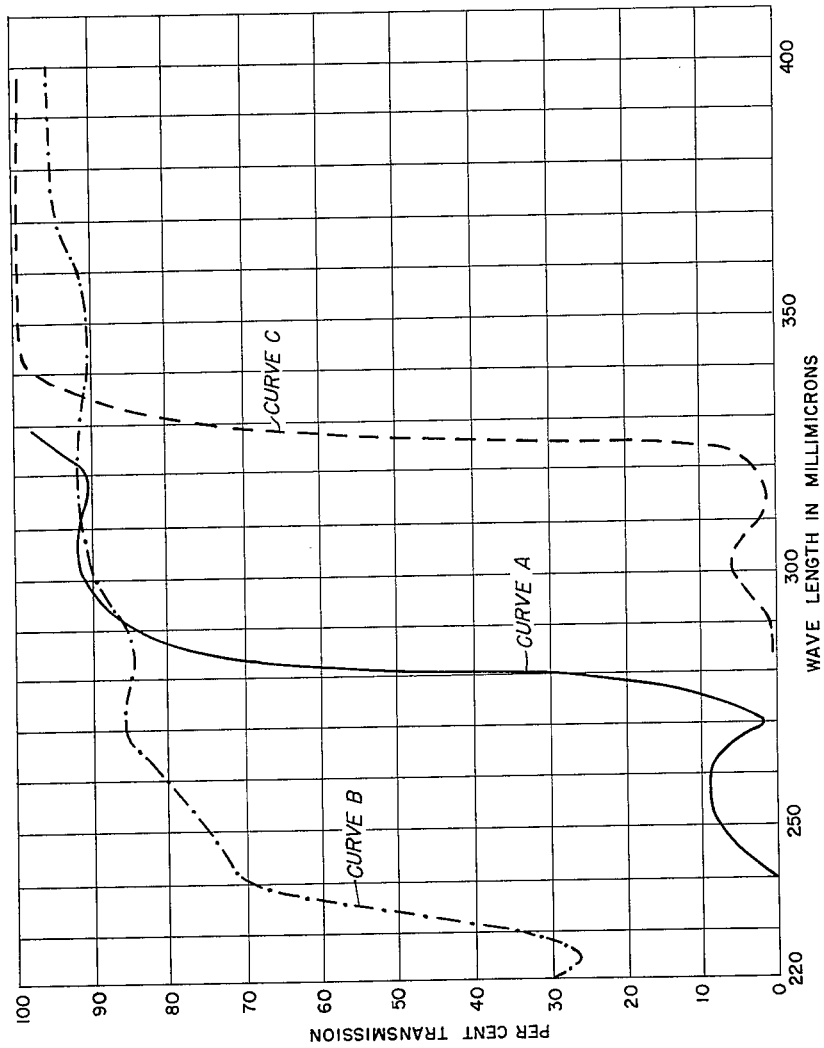
INVENTORS
DONALD L. KLASS
BY JOHN B. BRAUNWARTH
CHARANJIT RAI
ATTORNEY

3,242,807
ULTRAVIOLET ABSORBING COMPOSITION
Donald L. Klass, Barrington, and John E. Braunwarth, and Charanjit Rai, Crystal Lake, Ill., assignors, by mesne assignments, to Union Oil Company of California, Los Angeles, Calif., a corporation of California
Filed Dec. 26, 1961, Ser. No. 161,942
2 Claims. (Cl. 88—106)

This invention relates to new ultraviolet absorbers comprising bis(2-benzoxazolyl) alkanes and bis(2-naphthoxazolyl) alkanes. More particularly, this invention relates to the discovery that bis(2-benzoxazolyl) alkanes, bis(2-naphthoxazolyl) alkanes, and derivatives thereof are effective ultraviolet absorbers and suitable for use in many applications for the purpose of absorbing ultraviolet light.

Ultraviolet absorbers have many applications. For example, they are used in plastics principally for stabilization of polymers or secondary ingredients against photocatalyzed deterioration, and in glazing, coating, and packaging materials for the purpose of making them capable of screening ultraviolet light. Ultraviolet absorbers, which must necessarily have high ultraviolet absorptivity and be stable to ultraviolet radiation, must also be (1) substantially free of color (initially and after aging); (2) compatible with the material with which they are used; and (3) inert to other additives, processing, and weathering. Among the commonly used ultraviolet absorbers are phenyl salicylate; t-butyl phenyl salicylate; 2,4-dihydroxy benzophenone; and alkylated 2-hydroxyphenyl benzotriazole.

Accordingly, it is a primary object of this invention to provide new ultraviolet absorbers comprising bis(2-benzoxazolyl) alkanes, bis(2-naphthoxazolyl) alkanes, and derivatives thereof.

Another object of this invention is to provide a method of increasing the ultraviolet absorption of materials by incorporating therein bis(2-benzoxazolyl) alkanes, bis(2-naphthoxazolyl) alkanes, and derivatives thereof, or mixtures of such compounds.

Still another object of this invention is to provide a method of protecting materials from ultraviolet rays by interposing between the source of ultraviolet rays and the material to be protected, a barrier containing bis(2-benzoxazolyl) alkanes, bis(2-naphthoxazolyl) alkanes, and derivatives thereof, or mixtures of such compounds.

A further object of this invention is to provide various articles of manufacture containing ultraviolet-light-absorbing amounts of bis(2-benzoxazolyl) alkanes, bis(2-naphthoxazolyl) alkanes, or mixtures of such compounds.

A still further object of this invention is to provide materials substantially translucent to visible light which contain ultraviolet-light-absorbing quantities of bis(2-benzoxazolyl) alkanes, bis(2-naphthoxazolyl) alkanes, and derivatives thereof, or mixtures of such compounds.

These and further objects of this invention will be described or become apparent as the description herein proceeds and reference is made to the accompanying graph which shows that the compounds of this invention are ideally suited as ultraviolet absorbers.

The new ultraviolet absorbers of this invention are characterized by having a bis(2-benzoxazolyl) alkane or bis(2-naphthoxazolyl) alkane nucleus containing from 1 to 10 methylene groups. These compounds are represented by the formula:

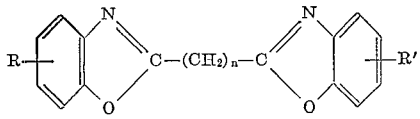

where $n$ has a value of 1 to 10, and R and R' are hydrogen, or the same or different hydrocarbon radicals. These compounds can be prepared by reaction of an ortho-aminophenol (or polycyclic aromatic analogs thereof) with a dibasic acid in the presence of polyphosphoric acid (PPA) as a catalyst. The polyphosphoric acid which is used as a catalyst in the preparation of the compounds is a commercial product consisting of a liquid mixture of polymeric phosphoric acids having a $P_2O_5$ content in the range of about 72–90%, preferably about 82–84%. In general, reaction periods ranging from less than one-half hour to about two hours are adequate for the reaction to go substantially to completion at temperatures ranging from about 100°–200° C. The severity of conditions required to cause the desired reaction to occur depend on the specific reactant being condensed with the ortho-aminophenol, and must be selected with care to avoid undesirable side reactions.

R and R' can be hydrogen or hydrocarbon radicals, such as alkyl, alkylene, aryl, aralkyl, aralkylene, alkaryl, and cycloalkyl radicals. Radicals in the aliphatic series include methyl, ethyl, propyl, isopropyl, butyl, isobutyl, t-butyl, amyl, isoamyl, t-amyl, hexyl, isohexyl, heptyl, isoheptyl, octyl, isooctyl, nonyl, isononyl, decyl, ethenyl, butenyl, butadienyl, isoheptenyl, etc. The aryl groups include phenyl, biphenyl, napthyl, anthryl, etc.; the aryl-substituted aliphatic radicals include benzyl, phenylethyl, phenylethenyl, phenylbutadienyl, etc.; the aliphatic-substituted aryl radicals include tolyl, xylyl, butenylnaphthyl, butadienylnaphthyl, etc.; and the cycloalkyl radicals include cyclopropyl, cyclobutyl, cyclophentyl, and cyclohexyl radicals. Radicals in the aliphatic series are preferably limited to those containing up to 10 carbon atoms and include unsaturated radicals with conjugation. From the above definition, it will be apparent that polycyclic aryl radicals and aliphatic-substituted derivatives thereof can be attached to the oxazole groups.

Species of compounds that come within the foregoing definition when R and R' are hydrogen are:

1,1-bis(2-benzoxazolyl)methane
1,2-bis(2-benzoxazolyl)ethane
1,3-bis(2-benzoxazolyl)propane
1,4-bis(2-benzoxazolyl)butane
1,5-bis(2-benzoxazolyl)pentane
1,10-bis(2-benzoxazolyl)decane Examples when R and/or R' are alkyl radicals are:

4-methyl-1,1-bis(2-benzoxazolyl)methane
6-ethenyl-1,1-bis(2-benzoxazolyl)methane
7,7'-dimethyl-1,1-bis(2-benzoxazolyl)methane
5,7'-diethyl-1,1-bis(2-benzoxazolyl)methane
5-(2,4-pentadienyl)-1,2-bis(2-benzoxazolyl)ethane
4-methyl, 6-nonyl, 5'-ethyl, 7'-decyl-1,1-bis(2-benzoxazolyl)methane
5-ethyl-1,2-bis(2-benzoxazolyl)ethane
4,5-dioctyl-1,2-bis(2-benzoxazolyl)ethane
4,6-diisopropyl-4',6'-diisopropyl-1,2-bis(2-benzoxazolyl)ethane
5-(2-butenyl)-1,3-bis(2-benzoxazolyl)propane
6,6'-dihexyl-1,3-bis(2-benzoxazolyl)propane
5,6-di-t-butyl-1,3-bis(2-benzoxazolyl)propane
4-methyl, 5-butyl, 6'-propyl-1,4-bis(2-benzoxazolyl)butane
5-(1,3-butadienyl), 7'-heptyl-1,5-bis(2-benzoxazolyl)pentane
4,4'-dioctyl-1,10-bis(2-benzoxazolyl)decane
6,7-dimethyl-4',5'-dimethyl-1,9-bis(2-benzoxazolyl)nonane Examples when R and/or R' are aryl radicals are:

4-phenyl-1,1-bis(2-benzoxazolyl)methane
5,7'-diphenyl-1,7-bis(2-benzoxazolyl)heptane 4-phenyl, 5'-biphenyl-1,8-bis(2-benzoxazolyl)octane
6-naphthyl-1,7-bis(2-benzoxazolyl)heptane
1,1-bis(2-naphthoxazolyl)methane
1,2-bis(2-naphthoxazolyl)ethane
1,3-bis(2-naphthoxazolyl)propane
1,5-bis(2-naphthoxazolyl)pentane
1,10-bis(2-naphthoxazolyl)decane
8-phenyl-1,3-bis(2-naphthoxazolyl)propane
4,7'-diphenyl-1,6-bis(2-naphthoxazolyl)hexane
6-phenyl, 5'-biphenyl-1,4-bis(2-naphthoxazolyl)butane
5-naphthyl-1,3-bis(2-naphthoxazolyl)propane
1,2-bis(2-anthraoxazolyl)ethane
1,1-bis(2-penanthraoxazolyl)methane Examples when R and/or R' are aryl-substituted aliphatic radicals are:

5-benzyl-1,4-bis(2-benzoxazolyl)butane
6-benzyl-7'-benzyl-1,6-bis(2-benzoxazolyl)hexane
7-phenylethyl-1,8-bis(2-benzoxazolyl)octane
5-styryl-1,5-bis(2-benzoxazolyl)pentane
6-phenylethyl-4'-benzyl-1,1-bis(2-benzoxazolyl)methane
5-methyl-1,2-bis(2-naphthoxazolyl)ethane
4-ethyl-8'-methyl-1,5-bis(2-naphthoxazolyl)pentane
4-phenylethenyl-1,3-bis(2-naphthoxazolyl)propane
6,9'-dipropyl-1,4-bis(2-naphthoxazolyl)butane
4-methyl, 5-ethyl, 8'-methyl-1,5-bis(2-naphthoxazolyl)pentane
6,8-diethyl-4',9'-dimethyl-1,1-bis(2-naphthoxazolyl)methane Examples when R and/or R' are aliphatic-substituted aryl radicals are:

4-(m-ethylphenyl)-1,2-bis(2-benzoxazolyl)ethane
5-(p-vinylphenyl)-1,4-bis(2-benzoxazolyl)butane
6,6'-di(m-propylphenyl)-1,5-bis(2-benzoxazolyl)pentane
7-(p-ethylphenyl)-1,7-bis(2-naphthoxazolyl)heptane
5,8'-di(m-ethylphenyl)-1,3-bis(2-naphthoxazolyl)propane
6-(p-tolyl)-1,8-bis(naphthoxazolyl)octane
7-(m-cumyl)-1,10-bis(naphthoxazolyl)decane Examples when R and R' are mixed alkyl, cycloalkyl, or aryl radicals are:

4-methyl-4'-phenyl-1,1-bis(2-benzoxazolyl)methane
5-t-butyl-6'-naphthyl-1,3-bis(2-benzoxazolyl)propane
6,7-diethyl, 4'-phenyl-1,4-bis(2-benzoxazolyl)butane
4-cyclohexyl, 5'-phenyl-1,5-bis(2-benzoxazolyl)pentane
5-methyl, 6-phenyl, 4'-ethyl, 7'-naphthyl-1,6-bis(2-benzoxazolyl)hexane
4,5,6,7-tetraethyl, 4'-cyclohexyl-1,7-bis(2-benzoxazolyl)heptane
5-methyl-8'-phenyl-1,2-bis(2-naphthoxazolyl)ethane
6-ethenyl-7'-phenyl-1,3-bis(2-naphthoxazolyl)propane
5-cyclohexyl-8'-phenyl-1,4-bis(2-naphthoxazolyl)butane
7-ethyl-8'-naphthyl-1,5-bis(2-naphthoxazolyl)pentane
6-(2,4-pentadienyl)-7'-phenyl-1,6-bis(2-naphthoxazolyl)hexane In accordance with this invention, any one or mixtures of two or more of the foregoing compounds are used at low concentrations, preferably in the range of about 0.05–8.0% by weight. It will be evident that the degree of absorptivity can be varied by varying the amount of the ultraviolet absorbers utilized. Generally, the utilization of large quantities of the ultraviolet absorbers of this invention is not required since an increase in the amount used will afford a somewhat greater absorption of ultraviolet light, but the increase in absorption is generally not in proportion to the additional amount used.

In order to demonstrate the ultraviolet-absorbing power of the compounds of this invention, several tests were conducted, the results of which are depicted in the accompanying graph. This invention was demonstrated by determining the ultraviolet absorptivity of several solutions of the compounds of this invention in isopropyl alcohol utilizing a Beckman DU. Spectrophotometer equipped with a blue phototube. The spectrophotometer is a combination of a spectroscope and a photometer into a single instrument which enables one to measure the wave length at which absorption takes place and the intensity of such absorption. The tests were carried out using a hydrogen lamp for wave lengths between 220 and 320 millimicrons and a tungsten lamp for wave lengths between 320 and 400 millimicrons. Referring to the accompanying graph, Curve A depicts the result of tests utilizing an 0.008% by weight solution of 1,4-bis(2-benzoxazolyl)butane in isopropyl alcohol. It will be seen that at a wave length of 290 millimicrons, there is approximately 95% transmission of ultraviolet light, but at a wave length of 280 millimicrons there is only about 30% transmission. As depicted by Curve B, the ultilization of an 0.0002% by weight solution of 1,4-bis(2-naphthoxazolyl)butane in isopropyl alcohol results in almost 100% transmission at a wave length of 330 millimicrons, but less than about 35% transmission at a wave length of 230 millimicrons. On the other hand, when tests were conducted utilizing an 0.01% by weight solution of 1,4-bis(2-naphthoxazolyl)butane in isopropanol there was almost 100% transmission at a wave length of 340 millimicrons, but less than 20% transmission at a wave length of 325 millimicrons, as depicted by Curve C.

The many applications of the novel ultraviolet-absorbing compounds of this invention will be apparent to one skilled in the art. For example, there are many instances where it is desirable to filter out ultraviolet light to protect a material from the deleterious effect ultraviolet light has thereon. Where an ultraviolet absorber is to be interposed between a source of ultraviolet light and the material to be protected therefrom, it is incorporated in a barrier consisting of a material in which it is compatible. The vehicle for the ultraviolet absorbers may be transparent or translucent to visible light in instances where it is also desirable that visible light passes through to the material being protected, or it may be opaque to visible light where there is no desire to let the visible light fall upon the material being protected.

Non-limiting examples of barriers which may be used include the various plastic materials such as cellulose esters, including cellulose nitrate, cellulose acetate and the like; cellulose ethers as ethyl and methyl cellulose; the polystyrene plastics, such as polystyrene itself; polymers of ring-substituted styrenes, such as p-methylstyrene; vinyl polymers, such as polyvinylacetate, polyvinylchloride, and the like; the acrylic resins, such as polymers and copolymers of methylacrylate, acrylamide, acrylonitrile, and the like; the polyolefins such as polyethylene, polypropylene and the like; and polyesters, including unsaturated-modified polyesters. In addition to the various plastics, the barrier may be any of the number of waxes, both natural and synthetic, and coating materials such as varnishes, gums, shellacs, and the like.

The novel ultraviolet absorbers of this invention are also useful as a coating for photographic film, having a plurality of light-sensitive emulsion layers, where it is desirable to prevent the action of ultraviolet light on the sensitive material. The deleterious ultraviolet light can be excluded by coating the film with a layer of transparent material, such as an inert gelatine, containing the ultraviolet absorbers. Alternatively, the ultraviolet absorbers of this invention may be incorporated in a sensitive emulsion layer or in a layer between two of the light-sensitive layers, or may be incorporated in a backing layer coated on the rear side of the film.

The ultraviolet absorbers of this invention can also be used as light filters, as for photographic purposes, by incorporating them in a suitable transparent material such as gelatine. If the filter is not sufficiently rigid to be used as such, it can be supported in any suitable manner, as between two pieces of glass.

In addition to the above uses and barriers, the ultraviolet absorbers may be utilized where it is desirable to increase the ultraviolet absorptivity of a material.

For example, they can be used as "optical bleaches" to whiten or brighten textile fiber, paper, or similar materials. The addition of a small amount of the compounds to household soaps or synthetic detergents, such as quaternary ammonium compounds, sodium fatty alcohol sulfates, etc., results in the washed textiles absorbing ultraviolet light, thereby becoming whiter and brighter.

As briefly mention before, ultraviolet absorbers are utilized in plastics for stabilization of polymers of secondary ingredients against photo-catalyzed deterioration of molded plastic articles, as well as to serve as an ultraviolet barrier. The photo-degradation of plastics by ultralight is a two-fold problem, loss of physical properties and discoloration. The addition of ultraviolet absorbers is the most widely used method of solving the problems. Examples of plastics in which it is desirable to incorporate ultraviolet absorbers are polyolefins, such as polyethylene, to prevent an ultraviolet-catalyzed oxidation reaction; polyester resins to prevent discoloration; polystyrenes to prevent discoloration; cellulosics, such as cellulose nitrate, to prevent discoloration and deterioration; and vinyl polymers to prevent discoloration. The ultraviolet absorbers can be dispersed throughout the mass of plastic or, if convenient, can be incorporated in the top layer of a laminated structure.

If desired, the foregoing compounds can also be utilized in liquid systems. The compounds are generally water-insoluble but are soluble in organic solvents, hydrocarbons, and the like. However, the water-insoluble compounds of this invention can be utilized in aqueous systems in combination with a suitable emulsifier.

The embodiments of this invention in which an exclusive property or privilege is claimed are defined as follows:

1. The method of protecting materials from ultraviolet rays which consists in interposing between the source of ultraviolet rays and said material a transparent plastic barrier containing about 0.05 to 8.0% by weight of 1,4-bis(2-naphthoxazoyl)butane.

2. An article of manufacture consisting of a transparent plastic body containing about 0.05 to 8.0% by weight of 1,4-bis(2-naphthoxazolyl)butane.

References Cited by the Examiner

UNITED STATES PATENTS

| | | | |
|---|---|---|---|
| 2,172,262 | 9/1939 | Schinzel | 96—69 |
| 2,231,684 | 2/1941 | Schinzel | 96—69 |
| 2,496,843 | 2/1950 | Anish | 96—84 |
| 2,773,869 | 12/1956 | Leavitt | 252—301.2 |
| 2,785,133 | 3/1957 | Craig | 252—152 |
| 2,809,123 | 10/1957 | Keller et al. | 117—33.5 |
| 2,873,206 | 2/1959 | Geigy et al. | 117—33.5 |
| 2,875,089 | 2/1959 | Ackermann et al. | 117—33.5 |
| 2,985,661 | 5/1961 | Hein et al. | 252—301.2 X |
| 2,995,525 | 8/1961 | Crounse | 252—152 |
| 3,036,084 | 5/1962 | Duennenberger et al. | 96—84 |
| 3,133,916 | 5/1964 | Duennenberger et al. | 252—301.2 X |

FOREIGN PATENTS 824,659  12/1959  Great Britain.

OTHER REFERENCES

Nyilas et al.: Journal American Chemical Society, vol. 82, pages 609–11 (1960).

Nyilas et al.: U.S. Atomic Energy Comm., TID–7612, pp. 99–120, August 1960.

Ried et al.: Justus Liebigs Annalen der Chemie, vol. 599, pp. 44–50 (1956).

NORMAN G. TORCHIN, *Primary Examiner.*

J. T. BROWN, *Examiner.*